(12) United States Patent
Walma

(10) Patent No.: US 10,147,196 B2
(45) Date of Patent: Dec. 4, 2018

(54) OCCUPANCY DETECTION

(71) Applicant: Cooper Technologies Company, Houston, TX (US)

(72) Inventor: Kenneth Dale Walma, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 43 days.

(21) Appl. No.: 15/370,970

(22) Filed: Dec. 6, 2016

(65) Prior Publication Data

US 2017/0161915 A1 Jun. 8, 2017

Related U.S. Application Data

(60) Provisional application No. 62/264,132, filed on Dec. 7, 2015.

(51) Int. Cl.
| | |
|---|---|
| *G06T 7/00* | (2017.01) |
| *G06K 9/00* | (2006.01) |
| *G06T 7/292* | (2017.01) |
| *F21V 33/00* | (2006.01) |
| *H04N 7/18* | (2006.01) |
| *H05B 37/02* | (2006.01) |

(52) U.S. Cl.
CPC .......... *G06T 7/292* (2017.01); *F21V 33/0052* (2013.01); *G06K 9/00771* (2013.01); *H04N 7/181* (2013.01); *H05B 37/0227* (2013.01); *G06T 2207/30196* (2013.01); *G06T 2207/30241* (2013.01); *G06T 2207/30242* (2013.01)

(58) Field of Classification Search
CPC ........ G06K 2009/2045; G06K 9/00771; G06T 2207/30242; F21V 33/0052; F21V 33/00
See application file for complete search history.

(56) References Cited

U.S. PATENT DOCUMENTS

| | | | |
|---|---|---|---|
| 9,593,843 B2 * | 3/2017 | McRory | H04N 7/185 |
| 9,742,970 B1 * | 8/2017 | Saha | H04N 5/2256 |
| 2011/0037852 A1 | 2/2011 | Ebling et al. | |
| 2012/0113646 A1 | 5/2012 | Carmody | |
| 2014/0152763 A1 | 6/2014 | Lim et al. | |
| 2014/0265870 A1 * | 9/2014 | Walma | H05B 37/0218 315/151 |
| 2015/0098709 A1 * | 4/2015 | Breuer | G01C 3/08 398/118 |
| 2015/0282282 A1 * | 10/2015 | Breuer | H05B 37/0272 315/152 |

OTHER PUBLICATIONS

International Search Report for application No. PCT/US2016/065100, dated Mar. 30, 2017.

* cited by examiner

*Primary Examiner* — Utpal D Shah
(74) *Attorney, Agent, or Firm* — King & Spalding LLP

(57) ABSTRACT

A system for determining occupancy includes a first luminaire having a first camera to detect a first occupant and a second luminaire having a second camera to detect a second occupant. The system further includes a processor to determine whether the first camera and the second camera have a common visual field and to determine whether the first occupant and the second occupant are the same occupant in response to determining that the first camera and the second camera have a common visual field.

17 Claims, 6 Drawing Sheets

OCCUPANCY DETECTION

RELATED APPLICATIONS

The present application claims priority under 35 U.S.C. § 119(e) to U.S. Provisional Patent Application No. 62/264,132, filed Dec. 7, 2015, and titled "Occupancy Detection," the entire content of which is incorporated herein by reference.

TECHNICAL FIELD

The present disclosure generally relates to occupancy detection, in particular to improved accuracy of occupant count detection.

BACKGROUND

LED solid state luminaires provide a broad, uniform, powered, electrical platform for the integration of sensing equipment such as image sensors (e.g., cameras). The sensors may not only be used to view and track activity, but also to establish occupancy. That is, the sensors may be used to establish whether one or more occupants are present in a space and the number of occupants in the space—both whether occupied/unoccupied and number of occupants. While some image sensors may recognize and count, for example, humans and/or objects, within their respective visual fields, such multiple image sensors that are in close proximity of the same monitored area may all count the same person. For example, multiple camera sensors that have overlapping fields of vision may each count the same entity, which may lead to a total tally of occupants that is more than the actual number of occupants. Because the sensors may not have fully overlapping fields of vision, using the count from just one of the sensors may lead to a total tally of occupants that is fewer than the actual number of occupants. Thus, while individual image sensors can count objects or humans in their own visual field, multiple image sensors viewing the same area may lead to a miscount of objects and/or humans.

Thus, in some applications, systems and methods that improve occupancy detection by determining whether multiple image sensors have a common visual field are desirable.

SUMMARY

The present disclosure relates generally to occupancy detection, in particular to improved accuracy of occupant count detection. In an example embodiment, a system for determining occupancy includes a first luminaire having a first camera to detect a first occupant and a second luminaire having a second camera to detect a second occupant. The system further includes a processor to determine whether the first camera and the second camera have a common visual field and to determine whether the first occupant and the second occupant are the same occupant in response to determining that the first camera and the second camera have the common visual field.

In another example embodiment, a method for determining occupancy includes determining whether a first camera of a first luminaire and a second camera of a second luminaire have a common visual field. The method further includes detecting, by the first camera of the first luminaire, a first occupant in the common visual field, and detecting, by the second camera of the second luminaire, a second occupant in the common visual field. The method also includes determining, by a processor, whether the first occupant and the second occupant are the same occupant in response to determining that the first camera and the second camera have the common visual field.

In another example embodiment, a system for determining occupancy includes a first luminaire having a first camera to capture a first image, and a second luminaire having a second camera to capture a second image. The system further includes a processor to determine whether the first camera and the second camera have a common visual field and to determine whether a first occupant in the first image and a second occupant in the second image are the same occupant in response to determining that the first camera and the second camera have a common visual field.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
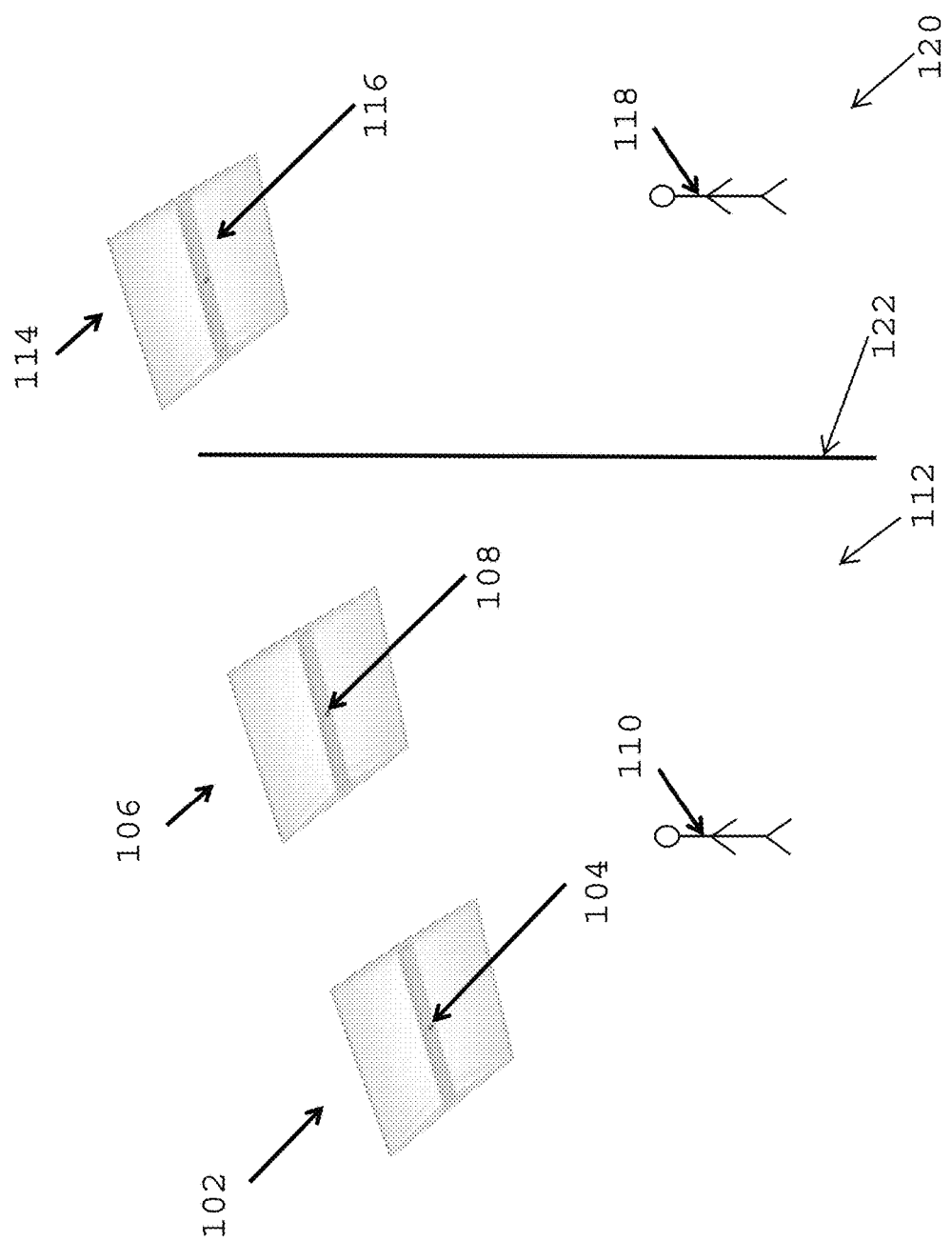
FIG. 1 illustrates an occupant detection system that uses luminaire integrated cameras according to an example embodiment.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. In the drawings, reference numerals designate like or corresponding, but not necessarily identical, elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates an occupant detection system 100 that uses luminaire integrated cameras according to an example embodiment. In some example embodiments, the system 100 includes a first luminaire 102 and a second luminaire 106. The first luminaire 102 includes a camera 104. The second luminaire 106 includes a camera 108. For example, the luminaries 102, 106 may be installed in a conference room, a hallway, an office, etc. In some example embodiments, the system 100 may include a third luminaire 114 that includes a camera 116.

In some example embodiments, whether the camera 104 has a common visual field with the camera 108 may be determined to establish whether images captured by the cameras 104, 108 may be images of the same visual field or images of at least partially overlapping visual fields of the cameras 104, 108. A determination may also be made whether the camera 116 has the same visual area as the cameras 104, 108. A visual field of the camera 104 refers to an area of which the camera 104 can capture an image. A visual field of the camera 108 refers to an area of which the camera 108 can capture an image. A visual field of the camera 116 refers to an area of which the camera 116 can capture an image. A visual field of each luminaire 102, 106, 114 with respect to illumination is considered to be the same as the visual field of the respective camera 104, 108, 116 with respect to capturing an image. For example, the cameras 104, 108, 116 may be positioned such that the area illuminated by each of the luminaires 102, 106, 114 may also be captured by the respective camera 104, 108, 116.

To illustrate, the camera 104 is considered to have the same visual field as the luminaire 102, the camera 108 is considered to have the same visual field as the luminaire 106, and the camera 116 is considered to have the same visual field as the luminaire 114. Because the cameras 104, 108, 106 are attached to or located at or within the luminaires, the proximity or spatial relationship between the cameras 104, 108, 106 may be established by establishing the proximity or spatial relationship between the luminaires 102, 106, 114. For example, the proximity or spatial relationship between the luminaires 102, 106, 114 that is established during a commissioning of the luminaires 102, 106, 114 may be used to determine whether any of the cameras 104, 108, 106 have at least partially overlapping visual fields. In some example embodiments, a common visual field refers to a combination of visual fields of two cameras (e.g., visual fields of the cameras 104 and 108) even when the overlapping of the visual fields of the cameras is partial. Alternatively, a common visual field may refer to the overlapping area of the visual fields of the cameras.

During or after commissioning, the system 100 may determine whether the cameras 104, 108, 116 have a common visual area in one of several ways. For example, each luminaire 102, 106, 114 may indicate its presence in a particular area by emitting a light in a pattern that is unique to the particular luminaire. To illustrate, each luminaire 102, 106, 114 may emit a light that is modulated with identifier data that identifies the particular luminaire. Any of the other luminaires that receive the emitted light can determine from the received light that the particular luminaire that emitted the light is in the same visual field as the luminaire that received the light. The emitted light may be a visible light or a non-visible light (e.g., infrared light).

In some example embodiments, a visual inspection may be done first to determine that the cameras 104, 108 have the same or a common visual field. Whether movements are detected by both cameras 104, 108 or by processors that receive image data from the cameras 104, 108 may also be done prior to normal operation of the cameras is started.

To illustrate, the luminaire 102 may determine that it is in the same visual field as the luminaire 104, and the luminaire 104 may determine that it is in the same visual field as the luminaire 102. The luminaires 102, 104 may determine that they are in a different visual field from the luminaire 114 because light emitted by the luminaire 114 does not reach the luminaires 102, 104. Similarly, the luminaire 114 may determine that luminaires 102, 104 are in a different visual field. For example, a visual field 112 and a visual field 120 may be separated by a wall 122. Alternatively, the third luminaire 114 may be installed in the same areas as the first and second luminaires 102, 106 but may be located such that the luminaire 114 does not have a common visual field with the luminaires 102, 106. Examples of determining visual fields of luminaires are described in U.S. patent application Ser. No. 14/215,758, the entire content of which is incorporated herein by reference.

In some example embodiments, each luminaire 102, 106, 114 may determine whether the other luminaries have the same or different visual field, for example, using a processor that can perform such function. For example, a processor in the luminaire 102 may determine that the luminaire 106 has a common visual field with the luminaire 102 by processing information extracted from a light received by luminaire 102. To illustrate, a light may be received, for example, by the camera 104 and the processor may process (e.g., demodulate and/or decode, etc.) an electrical signal generated from/based on the received light. The processor in the luminaire 102 may determine that the luminaire 102 has a common visual field with the luminaire 106, if the processor determines that the information includes the identifier of the luminaire 106. Each luminaire 106, 114 may perform a similar operation to determine whether one or more other luminaires have a common visual field with the particular luminaire 104, 106.

Alternatively or in addition, instead of each luminaire processing the information extracted from a respective received light, the luminaires 102, 106, 114 may transmit the information extracted from a received light to an external processor that identifies the luminaires that have a common visual field and the luminaires that have different visual fields. As indicated above some example embodiments, a determination of the visual fields of the luminaires 102, 106, 114 may be performed prior to a normal operation of the cameras to detect occupants (e.g., during commissioning of the luminaires).

In some example embodiments, the camera 104 and the camera 108 may detect an occupant (e.g., a person) 110 in a visual field 112. The camera 104 and the camera 108 may detect the occupant 110 using methods known to those of ordinary skill in the art with the benefit of this disclosure. For example, the cameras 104, 108 may detect the occupant 110 based on the pixel representation of the occupant 110. To illustrate, the pixel representation of the occupant 100 may correspond to an expected pixel representation of a person. For example, number of pixels, pixel intensity, etc. may be used to detect the occupant 110 in the visual field 112. In some alternative embodiments, methods that do not use pixel mapping (i.e., pixel representation of an image) known to those of ordinary skill in the art may be used to detect the occupant 110.

In some example embodiments, the camera 116 of the third luminaire 114 may detect an occupant 118 in a visual field 120. The camera 116 may detect the occupant 118 using the same or similar methods used by the cameras 104, 108. For example, the camera 116 may detect the occupant 118 based on the pixel representation of the occupant 118 with respect to an expected pixel representation of a person. The number of pixels, pixel intensity, etc. may be used to detect the occupant 118 in the visual field 118. Alternatively, methods that do not use pixel mapping known to those of ordinary skill in the art may be used to detect the occupant 118.

In some example embodiments, a remote processor may receive image data from the camera 104 and detect the occupant 110 by processing the image data. The remote processor may also receive image data from the camera 108 and detect the occupant 110 by processing the image data. The remote processor may also receive image data from the camera 116 and detect the occupant 118 by processing the image data.

In some alternative embodiments, a processor that is at one of the luminaires 102, 106, 114 may receive image data from the camera 104 and detect the occupant 110 by processing the image data from the camera 104. The processor that is at one of the luminaires 102, 106, 114 may also receive image data from the camera 108 and detect the occupant 110 by processing the image data from the camera 108. The processor that is at one of the luminaires 102, 106, 114 may also receive image data from the camera 116 and detect the occupant 118 by processing the image data from the camera 116. For example, a processor that is integrated in the luminaire 102 may receive image data from the cameras 104, 108, 116 and detect the occupant 110 and the occupant 118 by processing the received image data.

After the detection of the occupant 110 and the occupant 118 by the cameras 104, 108, 116, the remote processor (e.g., the processor shown in FIG. 3), or the processor at one of the luminaires 102, 106, 114, (e.g., the processor shown in FIG. 4), a processor (e.g., the processor shown in FIG. 3 or 4) may determine whether one or two occupants are detected by the cameras 104, 108. To illustrate, the processor may first determine whether the cameras 104, 108 have a common visual field. For example, the processor may retrieve information that indicates whether the cameras 104, 108 have a common visual area. The information may be established during or after commissioning of the luminaires 102, 106, 114. Alternatively, the processor may further process the information to determine whether the cameras 104, 108 have a common visual area. After determining that the cameras 104, 108 have a common visual field, the processor may determine whether the occupant 110 in the image captured by the camera 104 is the same occupant as the occupant in the image captured by the camera 108.

After the detection of the occupant 110 and the occupant 118 by the cameras 104, 108, 116, the remote processor (e.g., the processor shown in FIG. 3), or the processor at one of the luminaires 102, 106, 114, (e.g., the processor shown in FIG. 4), the processor may also determine whether the occupant 110 in the image captured by the camera 104 and the occupant 110 in the image captured by the camera 108 is/are the same or different from the occupant 118. To do so, the processor may first determine, in the same manner as described above with respect to the cameras 104, 108, whether the cameras 104, 108 each have a common visual field with the camera 116. After determining that the cameras 104, 108 do not have a common visual field with the camera 116, the processor may determine that the occupant 118 is distinct from the occupant 110.

In some example embodiments, a direction of movement of the occupant 110 captured by the camera 104 may be compared against the direction of movement of the occupant 110 captured by the camera 108 to determine whether the same occupant or different occupants are captured by the cameras 104, 108.

In some example embodiments, the camera 104 may determine a direction of movement of the occupant 110 based on the images captured by the camera 104. For example, the camera 104 may determine the direction of movement of the occupant 110 by comparing pixel mappings of two or more images captured by the camera 104. To illustrate, the relative position of the occupant 110 in multiple images captured by the camera 104 may indicate the direction of movement of the occupant 110. The camera 104 may provide the direction information to a remote processor (e.g., the processor shown in FIG. 3) or to a processor that is in one of the luminaires 102, 106, 114, (e.g., the processor shown in FIG. 4).

In some example embodiments, the camera 108 may determine a direction of movement of the occupant 110 based on the images captured by the camera 108, for example, by comparing pixel mappings of two or more images captured by the camera 108. The camera 108 may provide the direction information to a remote processor (e.g., the processor shown in FIG. 3) or to a processor that is in one of the luminaires 102, 106, 114 (e.g., the processor shown in FIG. 4).

In some example embodiments, the processor (e.g., the processor shown in FIG. 3 or 4) may receive the direction information from the cameras 104, 108 and compare the direction of movement of the occupant 110 determined by the camera 104 against the direction of movement of the occupant 110 determined by the camera 108 to determine whether the same occupant or different occupants are in the images captured by the cameras 104, 108. For example, if the comparison indicates the same direction of movement, the processor may conclude that the same occupant 110 was captured by the cameras 104, 108. If the comparison indicates different directions of movement, the processor may conclude that the occupant 110 captured by the cameras 104, 108 are two different occupants.

In some example embodiments, the processor (e.g., the processor shown in FIG. 3 or 4), instead or in addition to the cameras 104, 108, may determine the directions of movements of the occupant 110 detected by or based on images from the cameras 104, 108. To illustrate, a remote processor (e.g., the processor shown in FIG. 3) may receive multiple images from the camera 104 and determine the direction of movement of the occupant 110 in the images, for example, by comparing pixel mappings of two or more images. The remote processor may also receive multiple images from the camera 108 and determine the direction of movement of the occupant 110 in the images based on the images, for example, by comparing pixel mappings of two or more images. The processor may compare the directions of movement of the occupant 110 from the images captured by the cameras 104, 108 to determine whether one or two occupants are present. If the comparison indicates the same direction of movement, the processor may conclude that the same occupant 110 was captured by the cameras 104, 108. If the comparison indicates different directions of movement, the processor may conclude that the occupant 110 captured by the cameras 104, 108 are two different occupants.

In some example embodiments, a processor (e.g., the processor shown in FIG. 3 or 4) may determine whether the occupant 110 in the images captured by the camera 104 and the occupant 110 in the images captured by the camera 104 are the same occupant based on a motion of the occupant 110 in the images captured by the first camera 104 and a motion of the occupant 110 in the images captured by the second camera 108.

To illustrate, the processor may determine a change(s) in pixel mapping of the occupant 110 in images captured by the camera 104 by comparing multiple images of the occupant 110 captured by the camera 104. The processor may also determine a change(s) in pixel mapping of the occupant 110 in images captured by the camera 108 by comparing multiple images of the occupant 110 captured by the camera 108. If the changes in the images captured by the camera 104 and the changes in the images captured by the second camera 108 correlate well with each other, the processor may determine that the cameras 104 and 108 captured the same occupant, the occupant 110. In such cases, the occupant 110 captured/detected by the camera 104 and the occupant 110 captured/detected by the second camera 108 count as a single occupant.

If the changes in the images captured by the camera 104 and the changes in the images captured by the second camera 108 do not correlate well with each other, the processor may determine that the occupant 110 detected by the camera 104 and the occupant 110 detected by the camera 108 are different occupants and, thus, count as two occupants. The processor may use a threshold value of a correlation parameter to determine whether the occupant 110 captured/detected by the camera 104 and the occupant 110 captured/detected by the camera 108 are the same occupant.

In some example embodiments, the processor may perform both comparison of directions of movement as well as determination of correlation of motion of occupants captured in images from different cameras to determine whether the same or different occupants are captured in the images from the different cameras.

By determining that two or more cameras do not have a common visual field, occupants captured/detected by the cameras can be determined to be distinct occupants. When two or more cameras have a common visual field, performing comparison of directions of movement and/or determining correlation of motion of occupants captured/detected by the cameras enables determining whether the same or different occupants are captured/detected by the cameras. By integrating cameras with luminaires, information about the proximity or spatial relationship between the luminaires that is established, for example, during the commissioning of the luminaires, may be used to determine whether the respective cameras have a common visual field.

In some example embodiments, the system 100 may include more or fewer luminaires than shown in FIG. 1. In some example embodiments, image sensors other than cameras may be used. In some example embodiments, each camera may include a processor. The cameras shown in FIG. 1 may be disposed in different locations than shown, and different kinds of luminaires may be included in the system 100. In some alternative embodiments, the cameras 104, 108, 116 may be positioned external to the luminaires 102, 106, 114.

Figure 2:
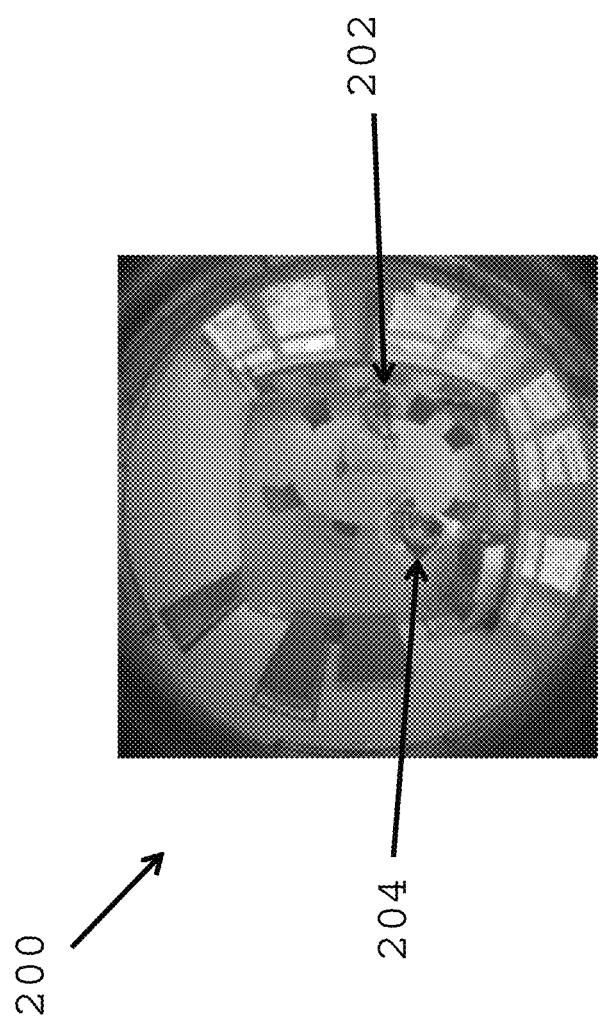
FIG. 2 illustrates an image captured with a camera of the system of FIG. 1 in accordance with an example embodiment.

FIG. 2 illustrates an image 200 captured with a camera of the system of FIG. 1 according to an example embodiment. Referring to FIGS. 1 and 2, the image 200 may be captured, for example, by the camera 104 of FIG. 1. In the image 200, two occupants 202, 204 are present, where the first occupant 202 is across a table from the second occupant 204. As described above with respect to FIG. 1, in some example embodiments, the number of pixels, pixel intensity, and other parameters related to the occupants 202, 204 in the image 200 may be used to detect the presence of the occupants 202, 204.

In some example embodiments, the camera 108 of the luminaire 106 may also capture an image that includes the occupants 202, 204, and the occupants 202, 204 in the image captured by the camera 108 may also be detected based on the number of pixels, pixel intensity, and other parameters related to the occupants 202, 204 in the image.

In some example embodiments, without determining whether the occupants 202, 204 detected by one image sensor (e.g., the camera 104) are the same or different occupants detected by another image sensor (e.g., the camera 108 or the camera 116), determining the total number of occupants may be challenging. For example, the total number of occupants may be mistakenly determined to be four if a common visual field of the cameras 104, 108 is not considered. By determining whether the cameras 104, 108 have a common visual field, further analysis may be performed to more accurately determine the total number of occupants. For example, the motions of the occupants 202, 204 in the image 200 captured by the camera 104 and the motions of the occupants in the image captured by the camera 108 may be analyzed to determine the level of correlation, for example, with respect to a threshold value of a correlation parameter as described above. Thus, by first determining whether the cameras 104, 108, 116 have a common visual field, the number of occupants in an area may be more accurately determined.

Figure 3:
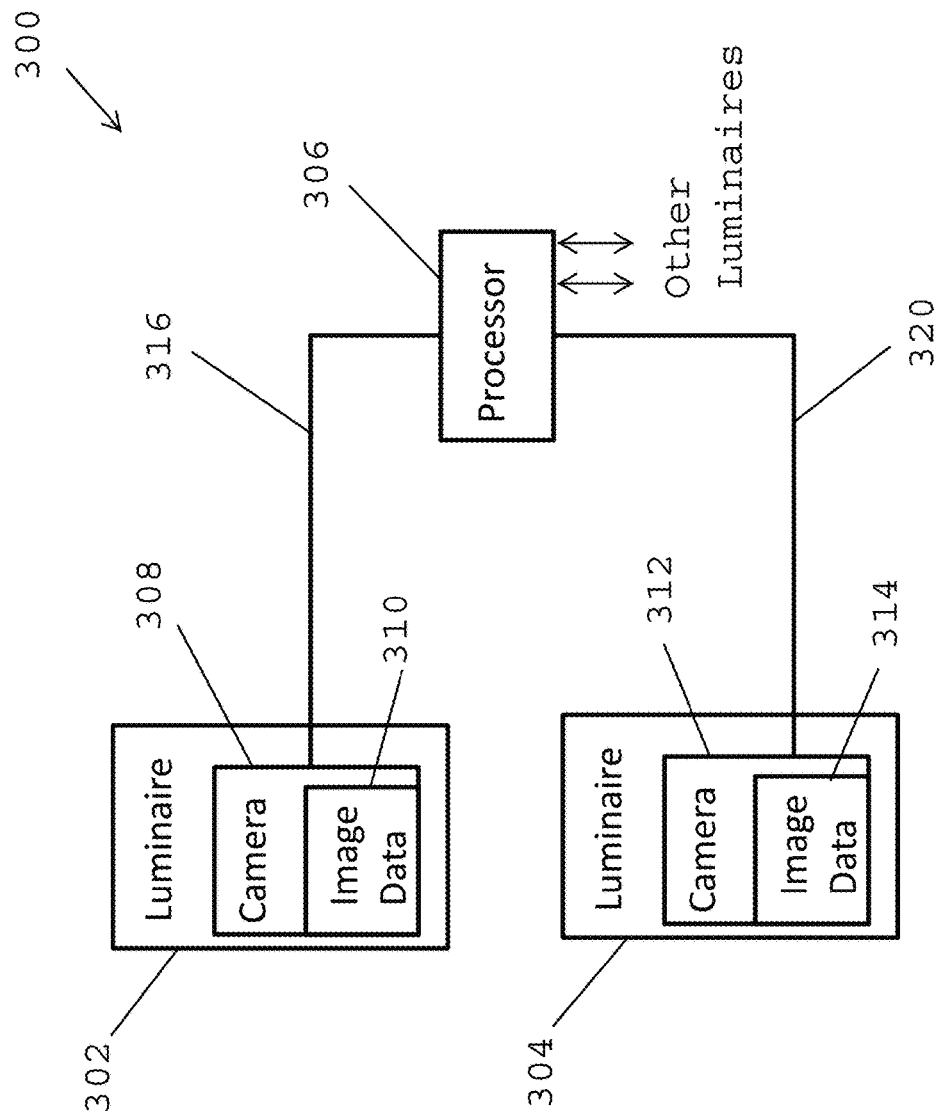
FIG. 3 illustrates a system of occupant detection according to another example embodiment.

FIG. 3 illustrates a system 300 of occupant detection according to an example embodiment. As illustrated in FIG. 3, the system includes a luminaire 302, a luminaire 304, and a processor 306. The luminaire 302 may include the camera 308, and the luminaire 304 may include the camera 312. The camera 308 may include a data storage 310, and the camera 312 may include a data storage 314. The data storages 310, 314 may be memory devices such as SRAMs integrated in the cameras 308, 312, respectively. Alternatively, the data storages 310, 314 may be memory devices such as flash memories that are unpluggable or otherwise easily removable.

In some example embodiments, the data storages 310, 314 may be used to store images captured by the cameras 308, 312. The image data corresponding to images captured by the camera 308 may be transferred to the processor 306 via a connection 316 with or without being stored at the data storage 310. The image data corresponding to images captured by the camera 312 may also be transferred to the processor 306 via a connection 320 with or without being stored at the data storage 314.

In some example embodiments, each camera 308, 312 may detect occupants and transfer the detection information to the processor 306. Alternatively or in addition, the processor 306 may process the image data from each of the cameras to detect occupants in the respective image data. For example, the luminaire 302 may be one of the luminaires 102, 106, 114, and the luminaire 304 may be another one of the luminaires 102, 106, 114, and the luminaires 302, 304 may operate in the same manner as described above with respect to the luminaires 102, 106, 114. As described above with respect to the cameras in FIG. 1, each camera 308, 312 may not only detect occupants but may also determine directions of movement of occupants detected by the particular camera.

Alternatively or in addition, the processor 306 may determine directions of movements of occupants detected by the cameras 308, 312 or by the processor 306. For example, processor 306 may determine whether the cameras 308 and 312 have a common visual area in the same manner as described with respect to FIG. 1. For example, the processor 306 may determine whether a light (encoded with identifier information of the luminaire 302) emitted by the luminaire 302 is received by the luminaire 304. To illustrate, the camera 312 may receive the emitted light and transfer the information to the processor 306. The processor 306 may also determine whether a light (encoded with identifier information of the luminaire 304) emitted by the luminaire 304 is received by the luminaire 302. To illustrate, the camera 308 may receive the emitted light and transfer the information to the processor 306.

In some example embodiments, a processor 306 may determine whether one or occupants in images captured by the camera 308 and in images captured by the camera 312 are the same occupant(s) based on motions of the occupant(s) determined from the captured images. To illustrate, the processor 306 may determine a change(s) in pixel mapping of an occupant detected in images captured by the camera 308 by comparing multiple images of the occupant captured by the camera 104. The processor 306 may also determine a change(s) in pixel mapping of an occupant in images captured by the camera 312 by comparing multiple images of the occupant captured by the camera 312. If the changes in the images captured by the camera 308 and the changes in the images captured by the second camera 312 correlate well with each other, the processor 306 may determine that the cameras 308, 312 had captured the same occupant. Otherwise, the processor 306 may determine that the cameras 308, 312 had captured the multiple occupants, as described above.

The system 300 may determine a total number of occupants by determining whether different cameras have a common visual field and performing further processing of captured images to avoid multiple counting of the same occupants.

Figure 4:
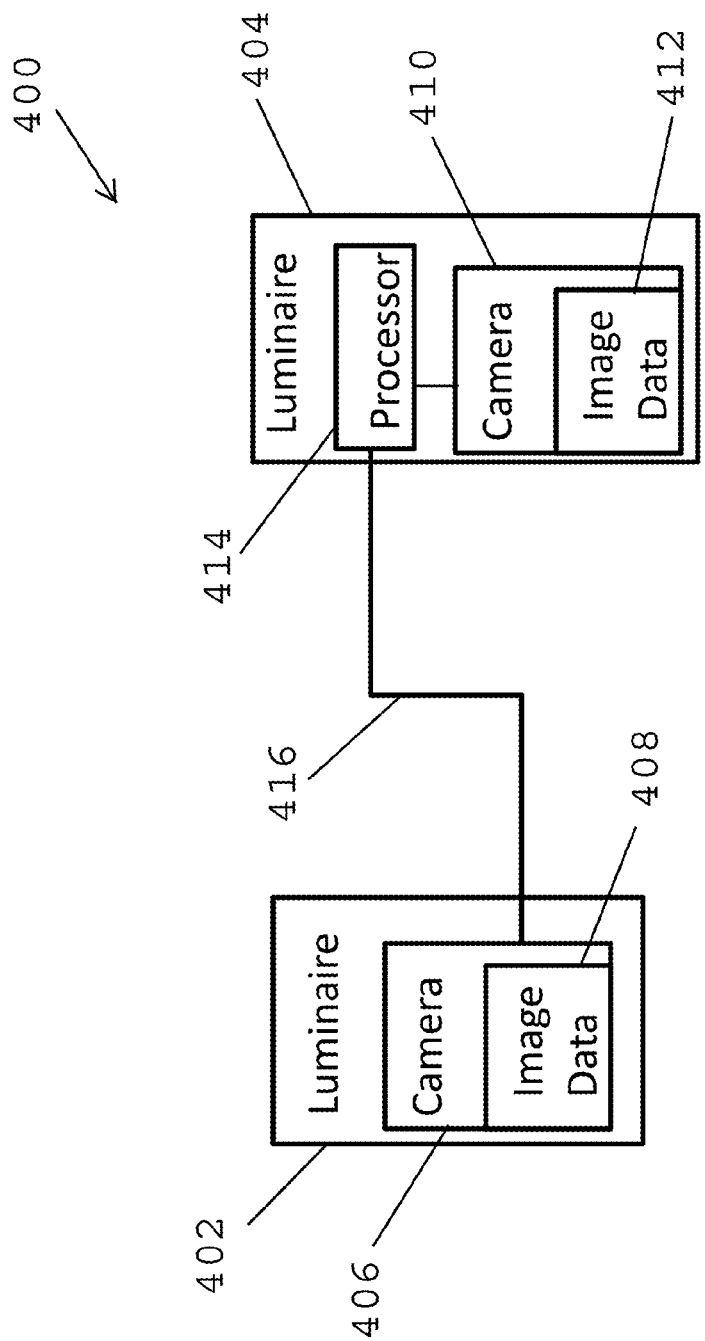
FIG. 4 illustrates a system of occupant detection according to another example embodiment.

FIG. 4 illustrates a system 400 of occupant detection according to another example embodiment. As illustrated in FIG. 4, the system 400 may include a luminaire 402 and a luminaire 404. The luminaire 402 may include a camera 406 with a data storage 408. The luminaire 404 may include a camera 410 with a data storage 412. The data storages 408, 412 may be memory devices such as SRAMs integrated in the cameras 406, 410, respectively. Alternatively, the data storages 408, 412 may be memory devices such as flash memories that are unpluggable or otherwise easily removable.

In some example embodiments, the luminaire 402 may be one of the luminaires 102, 106, 114, in FIG. 1 and the luminaire 404 may be another one of the luminaires 102, 106, 114, and the luminaires 402, 404 may operate in the same manner as described above with respect to the luminaires 102, 106, 114.

In some example embodiments, the luminaire 404 may include a processor 414 that can perform detection of occupants and determine directions of movements of occupants based on image data of images captured by the cameras 406, 410. For example, the camera 406 may provide image data of the image captured by the camera 406 to the processor 414 via connection 416. The camera 410 may provide image data to the processor 414 via internal connections of the luminaire 404. The processor 414 may also determine whether the cameras 406 and 410 have a common visual area in the same manner as described with respect to FIG. 1.

In some alternative embodiments, the cameras 406, 410 may perform detection of occupants from the images captured by the respective camera 406, 410 and provide the detection information to the processor 414. The cameras 406, 410 may also determine directions of motions of detected objects/occupants and provide the direction information to the processor 414, which can perform comparison of the information to determine the number of occupants in a similar manner as described above.

In some example embodiments, a processor 414 may determine whether one or occupants in images captured by the camera 406 and in images captured by the camera 410 are the same occupant(s) based on motions of the occupant(s) determined from the captured images in a similar manner as described above.

The system 400 may determine a total number of occupants by determining whether different cameras have a common visual field and performing further processing of captured images to avoid multiple counting of the same occupants.

Figure 5:
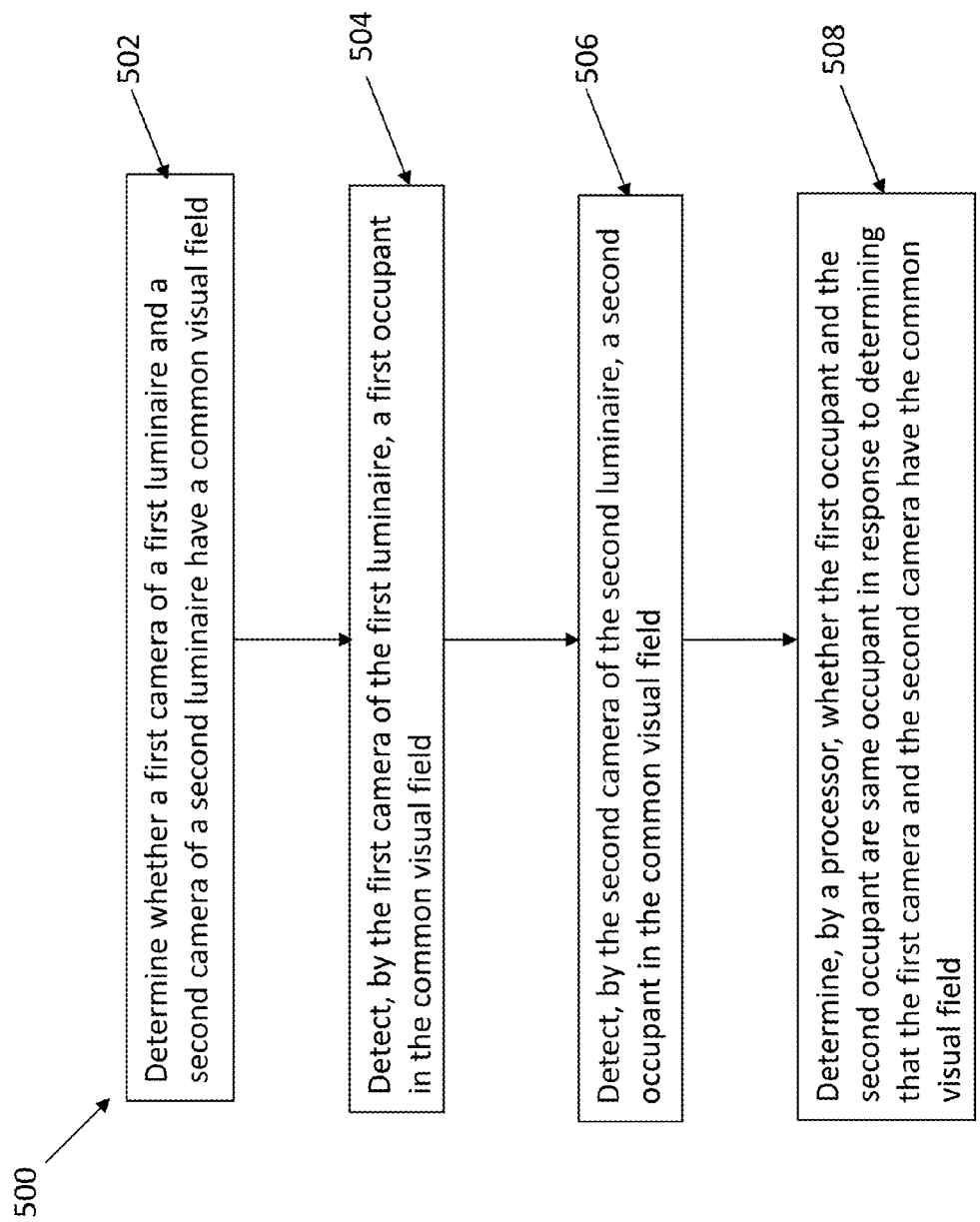
FIG. 5 illustrates a flowchart of a method of occupant detection according to an example embodiment.

FIG. 5 illustrates a flowchart of a method 500 of occupant detection according to an example embodiment. The method 500 may be used with the systems 100, 300, and 400 of FIGS. 1, 3, and 4, respectively. Referring to FIGS. 1 and 3-5, at step 502, the method 500 includes determining whether the first camera 104, 308, 406 of the first luminaire 102, 302, 402 and the second camera 108, 312, 410 of the second luminaire 104, 304, 404 have a common visual field. For example, the step 502 may be performed by the processor 306, 414. At step 504, the method 500 may include detecting, by the first camera 104, 308, 406 of the first luminaire 102, 302, 402, a first occupant in the common visual field. At step 506, the method 500 may include detecting, by the second camera 108, 312, 410 of the second luminaire 104, 304, 404, a second occupant in the common visual field. At step 508, the method may include determining, by the processor 306, 414, whether the first occupant and the second occupant are the same occupant in response to determining that the first camera and the second camera have the common visual field.

In some example embodiments, the method 500 may include determining, by the processor 306, 414, that the first occupant and the second occupant are different occupants in response to determining that the first camera and the second camera have different visual fields from each other. The method 500 may also include determining, by the processor 306, 414, a direction of movement of the first occupant based on images captured by the first camera 104, 308, 406, and a direction of movement of the second occupant based on images captured by the second camera 108, 312, 410.

In some example embodiments, the method 500 may include determining, by the processor 306, 414, whether the first occupant and the second occupant are the same occupant is performed by determining a level of correlation between a motion of the first occupant and a motion of the second occupant.

Figure 6:
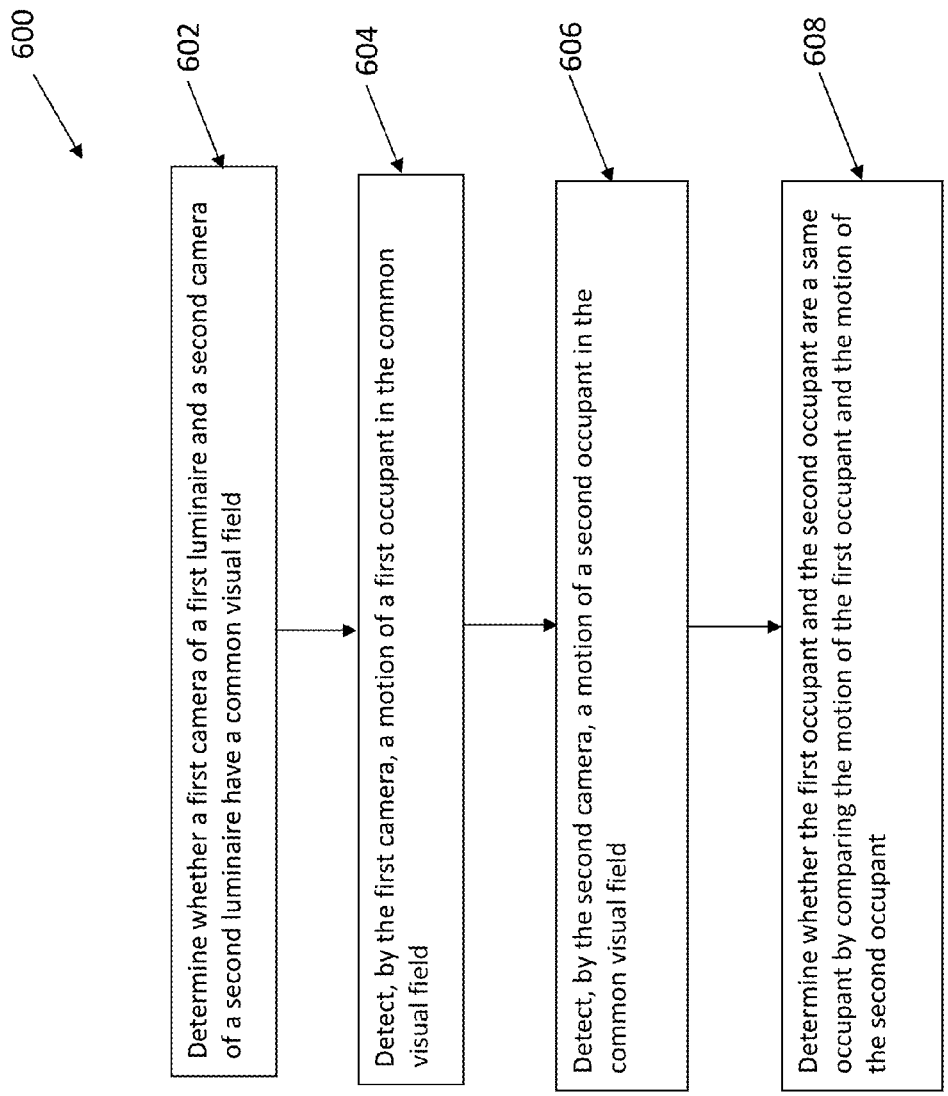
FIG. 6 illustrates a flowchart of a method of occupant detection according to another example embodiment.

Although a particular order of steps are shown in FIG. 6, in some alternative embodiments, different orders of steps may be performed without departing from the scope of this disclosure. In some alternative embodiments, some steps of the method 500 may be omitted without departing from the scope of this disclosure.

FIG. 6 illustrates a flowchart of a method 600 of occupant detection according to another example embodiment. The method 600 may be used with the systems 100, 300, and 400 of FIGS. 1, 3, and 4, respectively. Referring to FIGS. 1, 3, 4 and 6, at step 602, the method 600 includes determining whether the first camera 104, 308, 406 of the first luminaire 102, 302, 402 and the second camera 108, 312, 410 of the second luminaire 104, 304, 404 have a common visual field. The method 600 also includes detecting, by the first camera 104, 308, 406, a motion of a first occupant in the common visual field, at step 604, and detecting, by the second camera 108, 312, 410, a motion of a second occupant in the common visual field, at step 606. At step 608, the method 600 includes determining whether the first occupant and the second occupant are the same occupant by comparing the motion of the first occupant and the motion of the second occupant. In some example embodiments, comparing the motion of the first occupant and the motion of the second occupant includes determining changes in a pixel mapping of the first occupant, determining changes in a pixel mapping of the second occupant, and determining whether the changes in the pixel mapping of the first occupant and the changes in the pixel mapping of the second occupant correlate with each other, for example, within a threshold value.

Although a particular order of steps are shown in FIG. 6, in some alternative embodiments, different orders of steps may be performed without departing from the scope of this disclosure. In some alternative embodiments, some steps of the method 600 may be omitted without departing from the scope of this disclosure.

Although particular embodiments have been described herein, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A system for determining occupancy, the system comprising:
   a first luminaire having a first camera to detect a first occupant;
   a second luminaire having a second camera to detect a second occupant; and
   a processor configured to determine whether the first camera and the second camera have a common visual field and to determine whether the first occupant and the second occupant are a same occupant in response to determining that the first camera and the second camera have the common visual field, wherein the processor is configured to determine whether the first camera and the second camera have the common visual field based on a light emitted by the first luminaire and received by the second luminaire.

2. The system of claim 1, wherein the processor determines a direction of movement of the first occupant based on images captured by the first camera and wherein the processor determines a direction of movement of the second occupant based on images captured by the second camera.

3. The system of claim 2, wherein the processor determines whether the first occupant and the second occupant are the same occupant based on the direction of movement of the first occupant and the direction of movement of the second occupant.

4. The system of claim 1, wherein the processor determines whether the first occupant and the second occupant are the same occupant based on a motion of the first occupant and a motion of the second occupant.

5. The system of claim 1, wherein the light emitted by the first luminaire is received by the second camera and wherein the light emitted by the second luminaire is received by the first camera.

6. The system of claim 1, wherein the processor determines whether the first camera and the second camera have the common visual field during commissioning of the first luminaire and the second luminaire.

7. The system of claim 1, wherein the processor determines whether the first occupant and the second occupant are different occupants in response to determining that the first camera and the second camera have different visual fields from each other.

8. The system of claim 1, wherein the first camera transmits a message indicating a detection of the first occupant to the processor and wherein the second camera includes the processor.

9. The system of claim 1, wherein the first camera is integral to the first luminaire and wherein the second camera is integral to the second luminaire.

10. A method for determining occupancy, the method comprising:
    determining whether a first camera of a first luminaire and a second camera of a second luminaire have a common visual field;
    detecting, by the first camera of the first luminaire, a first occupant in the common visual field;
    detecting, by the second camera of the second luminaire, a second occupant in the common visual field; and
    determining, by a processor, whether the first occupant and the second occupant are a same occupant in response to determining that the first camera and the second camera have the common visual field, wherein the processor is configured to determine whether the first occupant and the second occupant are the same occupant at least by comparing a direction of movement of the first occupant against a direction of movement of the second occupant.

11. The method of claim 10, further comprising determining, by the processor, that the first occupant and the second occupant are different occupants in response to determining that the first camera and the second camera have different visual fields from each other.

12. The method of claim 10, further comprising determining, by the processor, the direction of movement of the first occupant based on images captured by the first camera and the direction of movement of the second occupant based on images captured by the second camera.

13. The method of claim 10, wherein determining, by the processor, whether the first occupant and the second occupant are the same occupant is performed by determining a level of correlation between a motion of the first occupant and a motion of the second occupant.

14. A system for determining occupancy, the system comprising:
    a first luminaire having a first camera to capture a first image;
    a second luminaire having a second camera to capture a second image; and
    a processor configured to determine whether the first camera and the second camera have a common visual field and to determine whether a first occupant in the first image and a second occupant in the second image are a same occupant in response to determining that the first camera and the second camera have a common visual field, wherein the processor is configured to determine whether the first camera and the second camera have the common visual field based on a light emitted by the first luminaire and received by the second luminaire, wherein the light includes identifier information of the first luminaire.

15. The system of claim 14, wherein the processor determines that the first occupant and the second occupant are different occupants in response to determining that the first camera and the second camera have different visual fields from each other.

16. The system of claim 14, wherein the processor determines whether the first occupant and the second occupant are the same occupant based on a direction of movement of the first occupant and a direction of movement of the second occupant.

17. The system of claim 14, wherein the processor determines whether the first occupant and the second occupant are the same occupant based on a motion of the first occupant and a motion of the second occupant.

* * * * *